United States Patent
Tener et al.

(10) Patent No.: US 8,515,611 B2
(45) Date of Patent: Aug. 20, 2013

(54) INERTIAL MEASUREMENT WITH AN IMAGING SENSOR AND A DIGITIZED MAP

(75) Inventors: Gene D. Tener, Oviedo, FL (US); Andrew H. Hawkins, Orlando, FL (US); Mark A. Bovankovich, Orlando, FL (US); Louis N. Glaros, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/593,402

(22) Filed: Aug. 23, 2012

(65) Prior Publication Data

US 2012/0320195 A1    Dec. 20, 2012

Related U.S. Application Data (62) Division of application No. 12/216,758, filed on Jul. 10, 2008, now Pat. No. 8,265,817.

(51) Int. Cl.
*G01C 22/00* (2006.01)

(52) U.S. Cl.
USPC ........................................... 701/23; 356/4.03

(58) Field of Classification Search
USPC ........................................................ 701/23
See application file for complete search history.

(56) References Cited

U.S. PATENT DOCUMENTS

| | | | |
|---|---|---|---|
| 4,802,757 A | 2/1989 | Pleitner et al. | |
| 4,988,189 A | 1/1991 | Kroupa et al. | |
| 5,257,209 A | 10/1993 | Markandey | |
| 5,682,332 A | 10/1997 | Ellenby et al. | |
| 5,783,825 A * | 7/1998 | Wiese | 250/330 |
| 5,852,792 A | 12/1998 | Nielson | |
| 5,893,043 A | 4/1999 | Moehlenbrink et al. | |
| 5,912,643 A | 6/1999 | Chew et al. | |
| 6,014,103 A | 1/2000 | Sumner et al. | |
| 6,768,465 B2 | 7/2004 | Stewart, II | |
| 8,265,817 B2 * | 9/2012 | Tener et al. | 701/23 |
| 2005/0060069 A1 | 3/2005 | Breed et al. | |
| 2008/0195304 A1 | 8/2008 | Krishnaswamy | |
| 2008/0195316 A1 | 8/2008 | Krishnaswamy | |

FOREIGN PATENT DOCUMENTS

EP    2 112 630 A1    10/2009

OTHER PUBLICATIONS

Broatch et al., An Intergrated Navigation System Manager Using Federated Kalman Filtering, IEEE, 1991, pp. 422-426.
Korean Office Action dated Jun. 16, 2011 with English Translation.

* cited by examiner

*Primary Examiner* — Michael Fuelling (57) ABSTRACT

The present invention relates to a system and method for determining vehicle attitude and position from image data detected by sensors in a vehicle. The invention uses calculated differences between the locations of selected features in an image plane and the location of corresponding features in a terrain map to determine the attitude of the vehicle carrying the sensors with respect to a ground frame of reference.

20 Claims, 7 Drawing Sheets

INERTIAL MEASUREMENT WITH AN IMAGING SENSOR AND A DIGITIZED MAP

This application is a Divisional of application Ser. No. 12/216,758, filed on Jul. 10, 2008, now U.S. Pat. No. 8,265,817 the entire contents of which are hereby incorporated by reference and for which priority is claimed under 35 U.S.C. §120.

TECHNICAL FIELD OF THE INVENTION

The present invention relates in general to the analysis of image data, and more particularly, to a system and method for determining vehicle attitude and position from image data detected by sensors in a vehicle.

BACKGROUND

Inertial measurement units generally make up a large portion of the cost of vehicles equipped with one. They provide inertial referenced velocity and attitude changes to a suite of navigation maintenance algorithms that 1) integrate them into evolving position and velocity estimates for vehicle guidance and 2) calculate pitch, yaw, and roll attitude and rate estimates for autonomous flight control.

A typical IMU mechanizes three orthogonal accelerometers and gyros. The advantage of an IMU is that it provides data from a purely internal frame of reference, requiring measurements only from its internal instrumentation and, therefore, rendering itself immune to jamming and deception. The disadvantages of IMUs are 1) their cost and 2) their inherent instrument drift, which manifests itself as an accumulating error in position, velocity, and attitude.

This combination of cost and navigation drift is especially problematic for applications where high accuracy is essential, such as missiles. GPS is a potential alternative, but it does not provide the attitude and attitude rate information required for flight control.

SUMMARY

The present invention seeks to satisfy navigation requirements and provide attitude data essential for robust vehicle flight control while addressing the issues of cost and instrument drift common to typical IMU systems. It presents an apparatus and method of position, velocity, and attitude measurement that does not require 1) gyros and accelerometers, or 2) the subsequent algorithms to integrate their outputs into a meaningful navigation solution. Instead the invention allows for navigation and attitude estimation based on scene flow information collected as a vehicle traverses diverse patches of mapped terrain.

An embodiment of the present invention is a navigation and attitude maintenance system consisting of an imaging sensor, a terrain map, and a unit for image processing and analysis. As will be discussed, a variety of sensors may be used, including infra-red, millimeter-wave, active or passive radio-frequency, or visible-spectrum imaging. A requirement of any sensor used in any embodiment of the invention is that it measures angle coordinates relative to itself. The angle coordinates may be extracted and analyzed in either the spatial or frequency domain.

The sensor images the area that the moving object, which may be an aircraft, a land vehicle, or an aquatic vehicle, is passing through. The unit then selects at least three points of reference from a captured image and matches these to points on a terrain map, validating them against a known terrestrial location. Once the points of reference have been matched and validated, the system determines, based on their location in the image plane, the location and orientation of the moving object the system is installed in. Attitude may be done on an entirely self-contained basis with only relative reference data and a built-in terrain map. Attitude data is derived from the absolute location of objects relative to the image plane. This absolute location is derived by extracting an earth-relative line of sight (LOS) angle based on the differences between object locations in the image plane and their locations in a reference map.

As the system continues to capture images, it tracks the movement of the matched reference points in the imaging plane and calculates a new location or orientation based on the relative changes in the position of the selected reference points. The system also continues to acquire new reference points and, when used for navigation, match them against the relevant sections of a terrain map or validate them against updated GPS position data as the moving object continues on its path or trajectory.

The system may be loaded with as few or as many terrain maps as necessary, and may be instructed to identify certain specific features in a scene to better allow it to confirm its location. The system may be used strictly for "dead reckoning" attitude control or as a primary or a secondary navigation system and may be used for a broad range of applications including detailed reconnaissance where certain features and landscape elements in an area are known, but a more detailed survey of the area is desired.

The system may employ active or passive sensors, and may utilize a plurality of sensors. The system may also allow for a user to identify specific features for matching against a terrain map or discard automatically selected features from further consideration.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF FIGURES

The present invention will become more fully understood from the detailed description given hereinbelow and the accompanying drawings which are given by way of illustration only, and thus are not limitative of the present invention, and wherein.

The drawings will be described in detail in the course of the detailed description of the invention.

DETAILED DESCRIPTION

Figure 1:
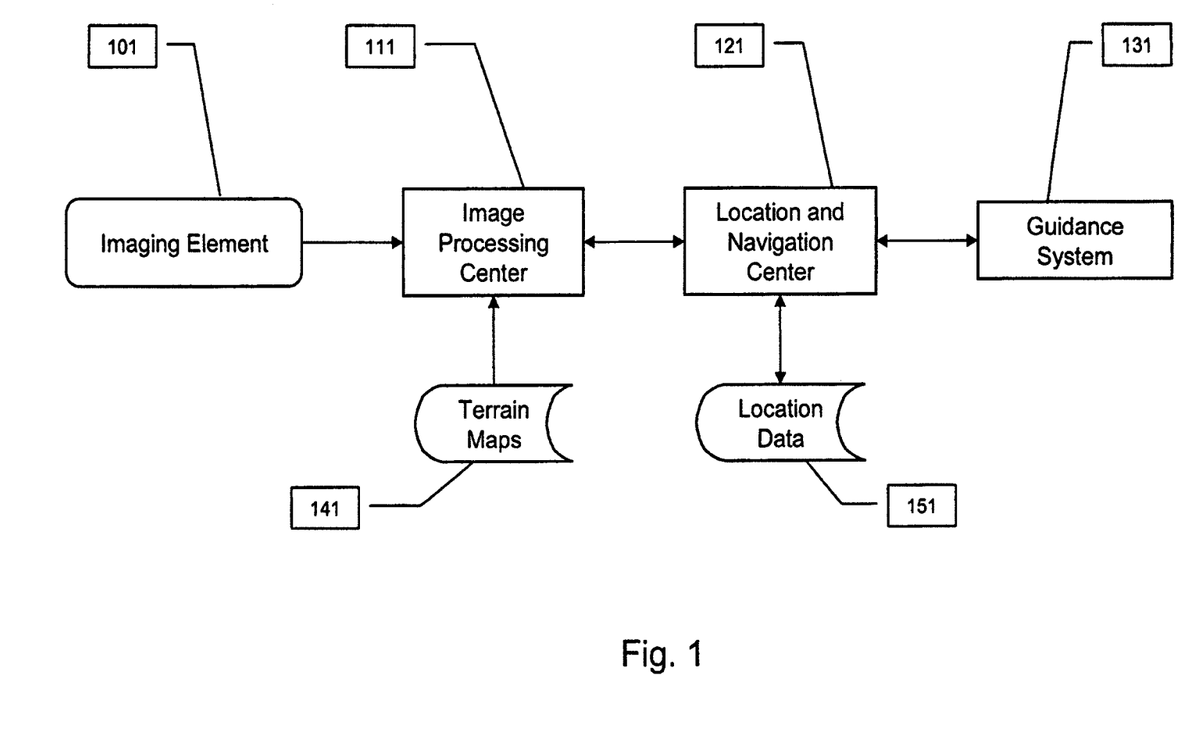
FIG. 1 is a block diagram of an embodiment of the inventive system.

The present invention comprises a method and apparatus for terrain map based navigation and attitude maintenance using: 1) a sensor capable of measuring the angle of a detected entity with respect to the sensor's boresight reference, and 2) a computation system to process the sensor data. FIG. 1 illustrates an embodiment of the present invention intended for attitude calculation and terrain map-based navigation. The imaging element 101 may consist of a passive sensor such as a visible-spectrum imaging device, a longwave or mid-wave infra-red detector, a millimeter-wave detector, a passive RF detector, or any other passive sensor capable of measuring the angle of a detected entity with respect to the sensor's boresight reference. The imaging element 101 may also consist of an active sensor such as RADAR or SONAR. The angle data acquired by the imaging element 101 may be extracted and analyzed in either the spatial or frequency domain.

In this embodiment of the invention, after image data is acquired, it is passed to an image processing section 111 that selects at least three features from the image data provided by the imaging element 101. The image processing center 111 also identifies and tracks features identified and selected in previous frames of image data. If there are still at least three previously identified viable features present in the current frame of image data, the image processing center 111 may not be required to identify and select new features from the image, although more features may be used to reduce error.

A viable feature is one that meets predetermined detection and selection criteria. For purposes of position and movement rate calculation, a viable feature may be one that is greater than a certain distance away from the edge of the image data, indicating that it will be detected again in a subsequent image frame. The certain distance from the edge of the image data is a configurable parameter that may be defined by external input or dynamically adjusted based on the current velocity of the object. For example, an embodiment of the system used in a guided missile may discard features moving away from the center of its field of view (FOV) as non-viable as soon as they are midway between the FOV center and an image edge. An embodiment of the system intended for use in a UAV, on the other hand, may wait until a feature is 75% of the way between the FOV center and an image edge before discarding it as non-viable and selecting a new feature to track on.

In own-vehicle attitude detection embodiments of the present invention that enable knowing own-vehicle orientation and have a terrain map with a variety of features, viable features may be anything within the FOV. Even the corner of a building or half of a large boulder, split by the edge of the FOV, could be used as a feature for correlation between the image and the map in some embodiments.

In an embodiment of the invention, the image processing center 111 also selects an appropriate terrain map 141 from a bank of terrain maps 141 and matches the identified features from the image data against features in the terrain map 141. Other embodiments of the invention may utilize only internally-loaded terrain maps if the system is being used strictly for relative attitude control and relative position information, and not for any absolute position or orientation data.

The identified features, along with any relevant terrain map, are next sent to a location and navigation center 121 in this embodiment of the invention. The location and navigation center 121 performs the actual calculations required to determine attitude, heading, velocity, and position from the acquired image data and any associated location data. Location data 151 from prior location calculations is stored and used to facilitate calculation and track relative changes in attitude and position.

Alternative embodiments of the invention may not require stored location data 151, especially in instances where the system is being used strictly for attitude measurement and control. An example of this is an embodiment where the system receives GPS data to establish ownership position.

The location and navigation center 121 passes the position and attitude calculations to a guidance system 131 which makes appropriate decisions about course and attitude correction based on the determined position and attitude of the vehicle.

Figure 2:
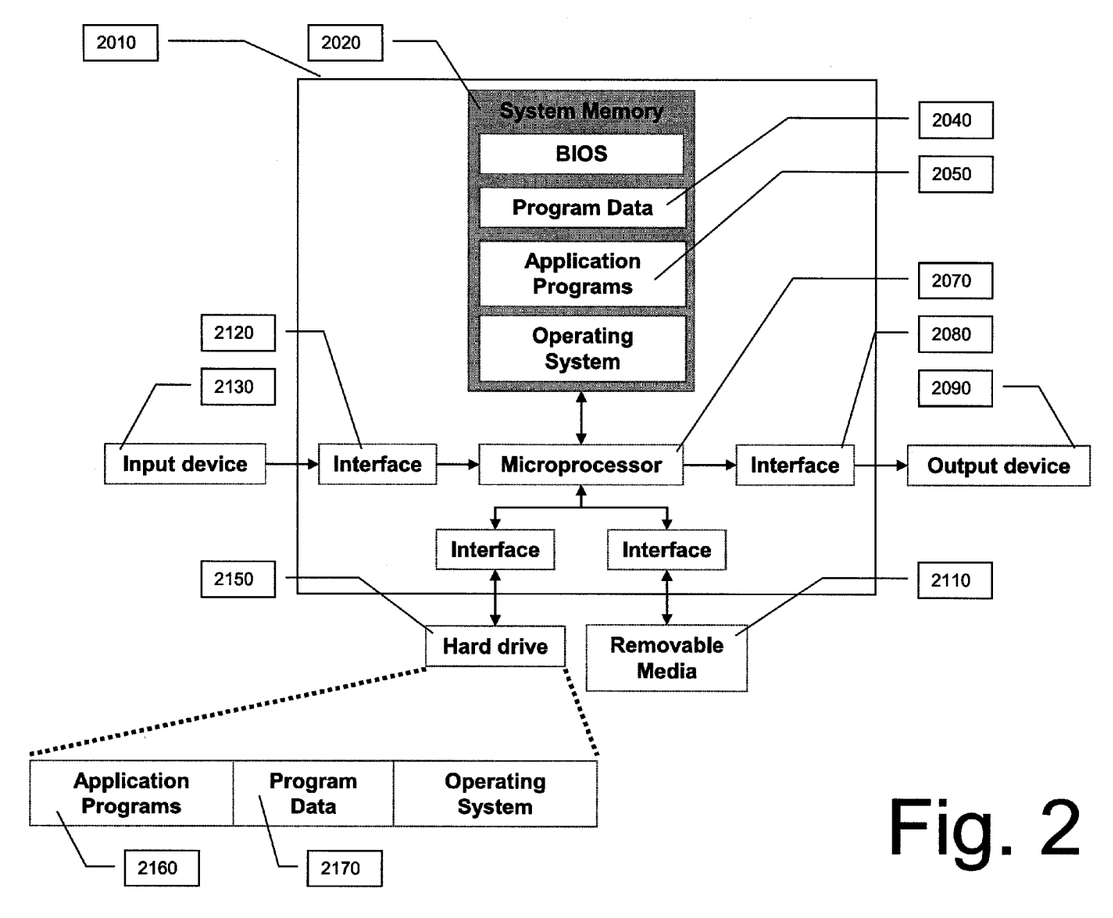
FIG. 2 shows the computational elements of an embodiment of the inventive system and their inter-relationship.

FIG. 2 shows a computer system running an application that processes image data to provide estimated attitude and position data. In this embodiment of the invention, the imaging element 101 is an input device 2130 with an interface 2120 to image processing and navigation calculation application programs 2050 and their associated program data 2040, which are stored in system memory 2020 and operated on by the microprocessor 2070. The application programs 2160 and any associated program data 2170 such as terrain maps 141 and location data 151 may be stored in a hard drive 2150 when not in use. Once the appropriate calculations and required processing has been performed, the system 2010 provides relevant attitude and position (depending on the embodiment) data to an output device 2090 such as a guidance system 131 through an output interface 2080.

Alternative embodiments of the inventive system may be implemented purely in hardware, having separate microprocessors 2070 running specialized application programs 2050 for each function of the system. Yet other embodiments of the inventive system may have a hardware configuration conducive to multiple types of navigation, attitude control, and position detection, with the particular algorithms to be used residing on removable media 2110 or other external data sources, and only being loaded into the system prior to use. The hardware configuration may also use FPGAs, ASICs, or other methods to implement the various algorithms.

Figure 3A:
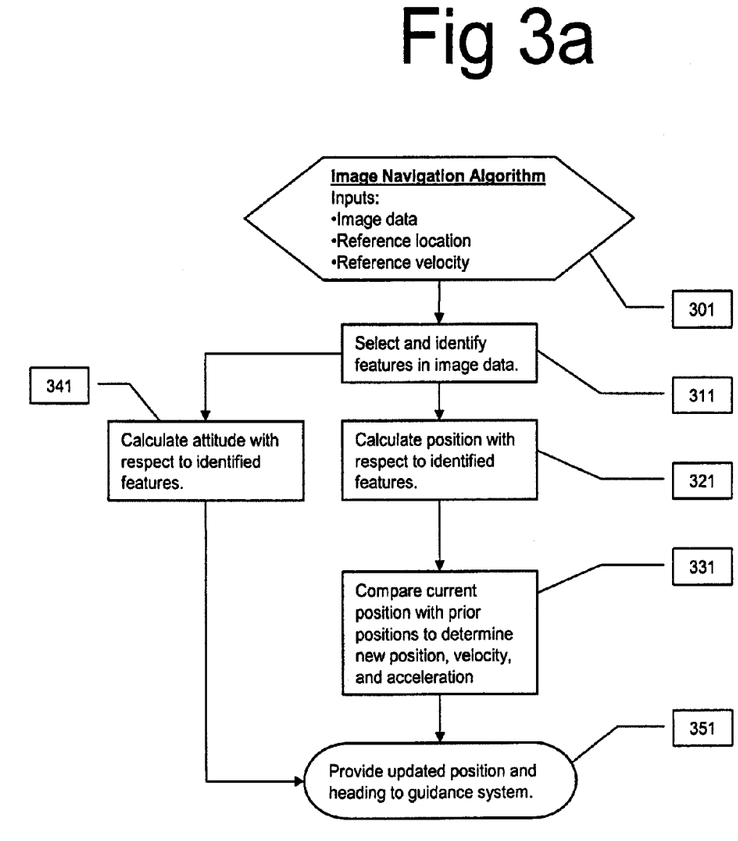
FIG. 3a is an algorithmic representation of an embodiment of a navigation system according to the present invention.

The image processing 111 and location and navigation 121 centers in FIG. 1 work together to execute an embodiment of an Image Navigation Algorithm, as depicted in FIG. 3a. The algorithm accepts incoming image data collected by the imaging element 101 as input 301. Additional input may comprise reference location and velocity information, depending on the specific uses an embodiment of the system is tailored to.

This embodiment of the algorithm first selects and identifies features in the incoming frame of image data 311. After at least three viable features are identified and correlated with the map, the next steps in this embodiment of the image navigation algorithm 301 are to calculate a vehicle position 321 and attitude 341 with respect to the identified features. These tasks are both accomplished by calculating the line-of-sight angles between the vehicle body and the identified features, and also the line-of-sight angles between the various features with respect to one-another.

Alternative embodiments of an image navigation algorithm 301 may have additional inputs of a reference attitude, or may not have reference location and reference velocity input data. The calculation of the position 321 may be a relative position or an absolute position. In the case of relative position, the algorithm may execute a comparison step 331 to compare the current position with a prior position. Absolute position may omit this step in embodiments that employ a technology such as GPS for absolute location data. Also, the new position and heading 351 may only be based on a calculated attitude, with the position data being provided by a separate system. The output of such alternative embodiments may be a calculated attitude and possible course corrections based thereon.

Figure 3B:
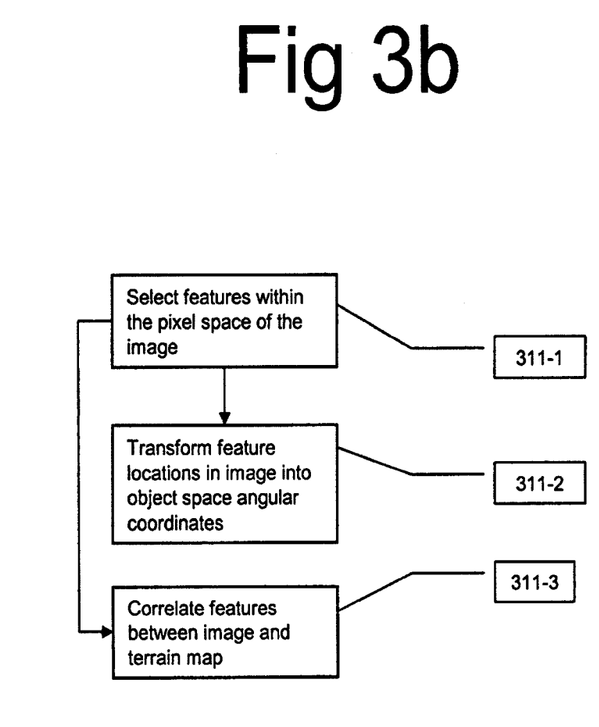
FIG. 3b is an algorithmic representation of an embodiment of the feature selection portion of the present invention.

FIG. 3b shows an embodiment of the feature identification portion of the present invention. Features are selected from a frame of image data captured by an imaging sensor in the vehicle. Features are selected from the pixel space of a given image frame 311-1 based on a pre-programmed or dynamically determined set of criteria. Different embodiments of the present invention may employ different feature selection criteria based on the intended function of the vehicle containing a system according to the present invention and also based on the route and terrain such a vehicle is expected to traverse. Embodiments intended for high-speed aerial movement over urban areas, for example, may have a feature selection bias towards buildings and street intersections located towards the front of the image plane relative to the vehicle.

Once at least three features are selected, an embodiment of a system according to the present invention transforms the selected feature locations within the image plane into object space angular coordinates 311-2 that provide vehicle-relative line-of-sight angle information. Alternate embodiments of the present invention may employ additional features, or may use a composite image plane composed of input from multiple vehicles to simultaneously provide earth-relative and vehicle-relative attitude information across multiple vehicles equipped with a networked or distributed embodiment of the inventive system.

An embodiment of the inventive system also correlates the selected features from the image plane to features in an image or image chip of a terrain map 311-3. Alternative embodiments of the present invention may omit this step and instead generate purely relative attitude calculations based on the movement of selected features across image frames over time. Yet further alternative embodiments of the present invention may have terrain maps at multiple angles, enabling the inventive system to select a map whose angle of imaging most closely matches the selected features in the image data. Such an embodiment may reduce downstream attitude and position calculation operations.

Figure 3C:
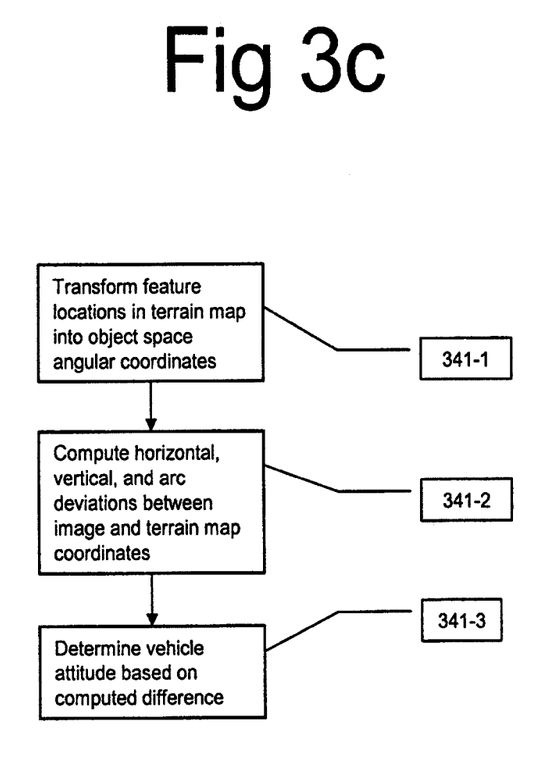
FIG. 3c is an algorithmic representation of an embodiment of the attitude computation portion of the present invention.

FIG. 3c shows an embodiment of the attitude calculation portion of the present invention. Features correlated from the electro-optical imaging data gathered by the vehicle to an internal terrain map are transformed into object-space angular coordinates relative to the terrain map 341-1. These coordinates provide earth-relative line-of-sight angle information for the correlated features The terrain map angular coordinates are then compared against the image data angular coordinates generated during the feature identification process 311-2 to compute the horizontal, vertical, and arc-length differences between the two coordinate sets 341-2. These differences are line-of-sight angle differences that enable the determination of variations in viewing angle in the earth-relative and vehicle-relative coordinate sets, and therefore a determination of vehicle attitude relative to earth. The vertical differences relate to pitch, the horizontal relate to roll, and the arc-length to yaw. Based on these difference values for each selected feature, an earth-relative vehicle attitude may be computed 341-3.

Alternative embodiments of the present invention that only calculate relative attitude may use a previously captured image frame instead of a terrain map, and embodiments that use large numbers of features may only perform transform, correlation, and calculation operations on a sub-set of features. Embodiments of the present invention may store terrain maps internally, in other hardware located in the vehicle, or may communicate with a remote station to request map data or transmit image data for processing and attitude computation.

In an embodiment of the present invention that tracks position and attitude, velocity and acceleration are calculated based on differences in position over time 331. After an absolute or relative position is calculated 321, this information is stored and compared to subsequent position determinations over known time periods to establish velocity and acceleration vectors 331. The combined position, velocity, acceleration, and attitude data is then provided to a guidance system 351 or similar device. Alternative embodiments of the present invention may omit velocity and acceleration calculations or calculate these values by alternative methods or means. Alternative embodiments of the present invention may replace a guidance system with a targeting, tracking, imaging, or range-finding system.

Yet other alternative embodiments of the present invention may replace the feature detection, selection, and terrain map comparison aspects with ground beacons that have broadcast either relative or absolute position information to a vehicle for attitude, position, and/or velocity determinations. In such embodiments an electro-optical imaging system may be replaced with active or passive beacon search and detection systems.

Figure 4:
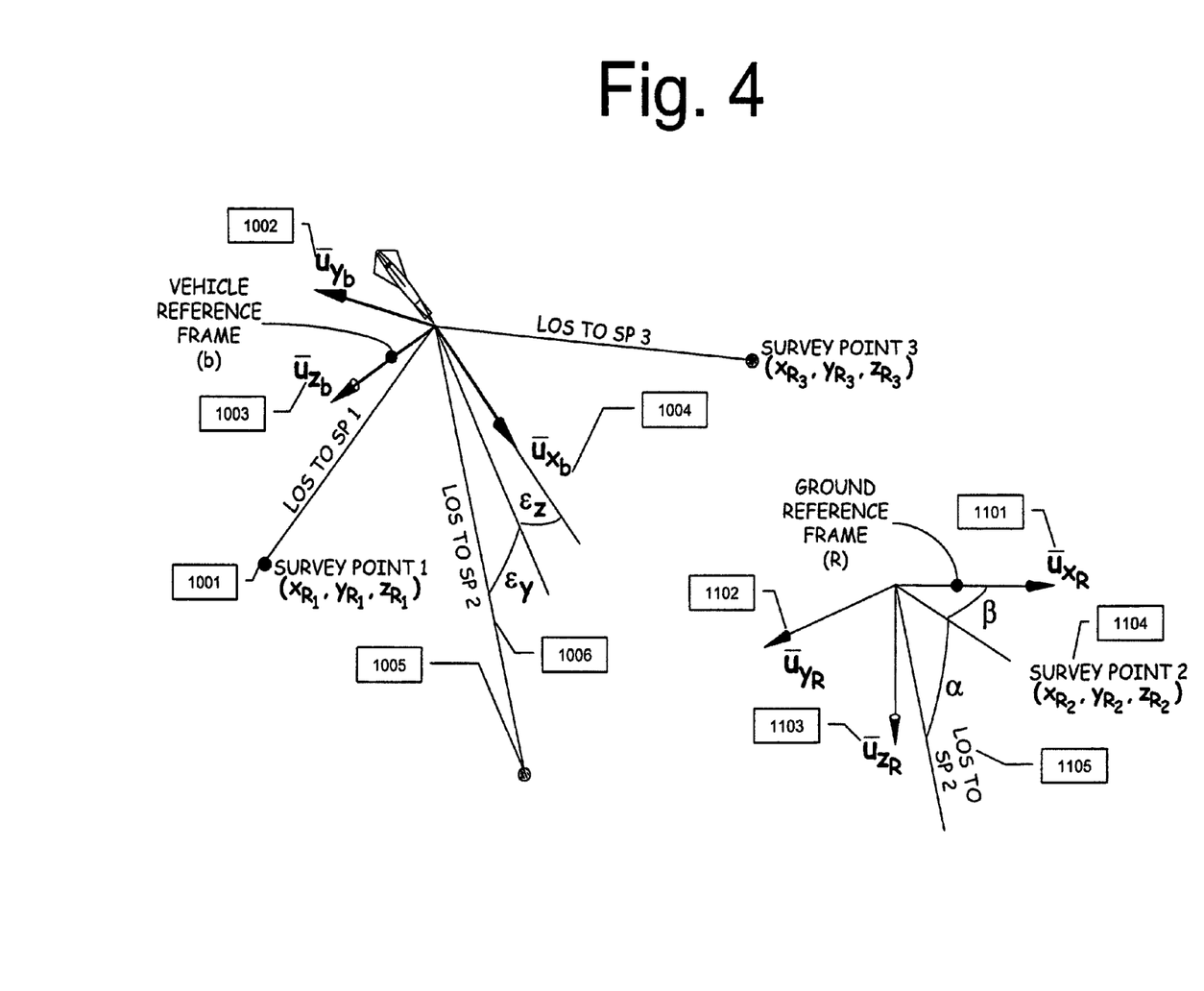
FIG. 4 shows vehicle and ground line of sight computations that may be used to determine relative vehicle position and attitude in an embodiment of the present invention.

FIG. 4 illustrates vehicle-centric and ground-centric angle and line-of-sight diagrams for identified features, shown here as survey points, with respect to the vehicle (b). Each survey point corresponds to an object space angular coordinate set derived from an identified feature in an image plane. An identified feature such as survey point 1 1001 has three relative spatial coordinates with respect to the vehicle (b). The vehicle is assumed to have three orientation vectors in space, $\bar{u}_{y,b}$ 1002, $\bar{u}_{z,b}$ 1003, $\bar{u}_{x,b}$ 1004. The line of sight (LOS) 1006 angles to a survey point 1005, $\epsilon_y$ and $\epsilon_x$ with respect to the x-direction orientation vector of the vehicle 1004 can be translated to the angles $\alpha$ and $\beta$ in the ground frame of reference (R) through the body attitude of the vehicle by using the yaw $\psi$, the pitch $\Theta$, and the roll $\phi$ Euler angles, but these Euler angle values are unknown prior to calculation.

The relative line-of-sight coordinates of a survey point with respect to the other survey points from a ground reference frame (R) are determined by comparing their locations in the image frame (the center of the image frame is taken to be a center point for calculation purposes), and the angles between other survey points. For example, he relative ground reference LOS coordinates of survey point 1 1001 with respect to survey point 2 1104 are determined by comparing their relative locations in the image frame and comparing the angles $\alpha$ between survey point 2 1104 and the vehicle line of sight to the survey point 1105 and $\beta$ between survey point 2 1104 and the x vector on the ground 1101. The ground-reference (R) line of sight (LOS) 1105 that is determined by angles $\alpha$ and $\beta$ can be reconstructed for any survey point in the ground reference frame (R) by using a known relative survey point location 1104 and an unknown vehicle position comprised of three coordinates (an x coordinate, a y coordinate, and a z coordinate).

Selecting at least three survey points results in six equations with six variables, creating an "information complete" mathematical situation conducive to being computationally resolved. Once the equations have been solved, the attitude of the craft can be ascertained from the values of the yaw $\psi$, the pitch $\Theta$, and the roll $\phi$ Euler angles—now calculated with respect to the ground frame of reference (R).

In an embodiment of the invention that also tracks and measures absolute position and movement rate, attitude information is coupled with feature-tracking information whereby the survey points selected for attitude determination are also matched and tracked against features in a terrain map to ascertain the location and movement rate of the vehicle. This combination of attitude and location information is then sent on to a navigation unit that compares the location and attitude of the vehicle against the expected location and attitude and against any target or destination or flight-path information and makes course corrections as necessary. The invention applies prevalent techniques of image processing for feature extraction and matching, so a discussion of this aspect of the invention is omitted with the understanding that such techniques are widely known and used in the field of image-based navigation.

Embodiments of the invention may also rely on fixed beacons for location determination. RADAR, Infra-red, or visually discernible beacons may be positioned along a vehicle's path of travel, and the vehicle may be equipped with some form of range-finding capability or a map containing known beacon locations and positions. Based on this information, the system may discern location data without requiring further image analysis.

A system that carries out attitude and position estimates according to the process described above is illustrated in FIG. 5. A system package of this type may consist of three passive sensors (5030, 5040, 5050) that measure a line-of-sight (LOS) angle to a ground spot with respect to the sensor mount. The sensors are arranged so that their individual pointing directions (1002, 1003, 1004) are not co-planar. Passive sensors suitable for an embodiment of such a system include passive RADAR systems that determine range and direction from an active emitter, passive IR systems that look for 'hotspot' beacons, and imaging systems (any type, including visual) whose output is correlated to either previously captured image data or a stored map image chip to establish the direction to the center of an area.

Figure 5:
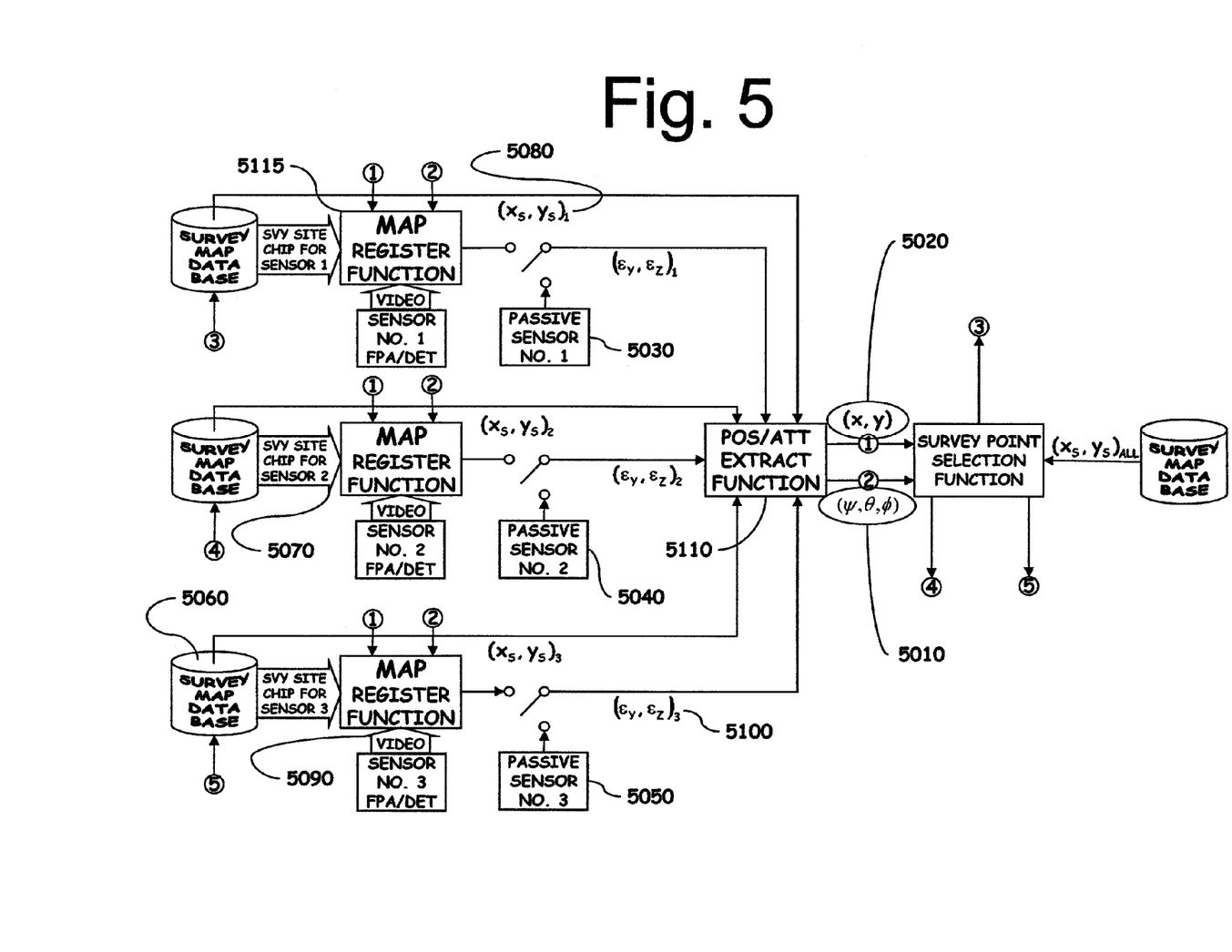
FIG. 5 shows a complete logic data flow diagram of an IMU replacement system for computing both location and attitude of a vehicle according to the present invention.

The embodiment shown in FIG. 5 is capable of calculating either attitude only, or attitude and position. Discussing the absolute attitude calculation in an embodiment of the present invention employing passive visual-spectrum imaging sensors; at each imaging time, a ground point 5100 of known location is selected for each passive device from a database 5060 by matching 5115 the video image captured by the sensor to a map or map portion stored in the database. Embodiments of the system may use a range of matching and searching techniques to accomplish this matching, and the limitations on how this matching is accomplished are imposed only by available memory and processing power. Once a map or map portion is selected for each ground point 5100, the combined surveyed coordinates 5080 and an image chip of the site containing all three ground points 5070 are extracted from the database.

This image chip 5070 is then correlated against each sensor's output video 5090 to extract the LOS angles from the sensor to the ground point 5100. An embodiment of the LOS angle extraction process may comprise running a correlation of the image to the map to the terrain map using affine transforms (shifts, zoom, roll, flip, and shear) to minimize error. An alternative embodiment of this process may implement the correlation in the frequency domain by multiplying the Fourier transform of the image by the Fourier transform of the map while monitoring the peak as shift, zoom, roll, flip, and shear are varied in either the image or map. Yet another alternative may include correlation after perspective projection. Still further alternative embodiments may employ holograms and other methods to accomplish angle LOS extraction.

After the LOS angles are extracted, each sensor's LOS angles are then converted to earth-relative angles with a position/attitude extract function 5110, using the best estimate of vehicle attitude 5010. Once the angles are converted, they are compared to the earth-relative angles as computed using the appropriate site survey coordinates and the best estimate of the vehicle position 5020. The measurement residual for each site is processed through a Kalman filter that reckons corrections to the current vehicle position and attitude estimates and their rates. The horizontal, vertical, and arc-length differences between the extracted earth relative and calculated map-oriented angles of the survey points correspond to the roll, pitch, and yaw orientations of the sensors relative to earth.

In an inventive embodiment that estimates vehicle attitude, the attitude extraction function to determine the earth-relative LOS of a sensor is defined by the following equations. First, the LOS unit vector (expressed in the detector coordinate frame) to a particular survey point (i) is computed as a function of the LOS angles ($\epsilon_{y_i}$ and $\epsilon_{z_i}$) measured relative to the detector:

$$\hat{u}_i^{d_i} = \begin{pmatrix} \cos(\varepsilon_{y_i}) \cdot \cos(\varepsilon_{z_i}) \\ \cos(\varepsilon_{y_i}) \cdot \sin(\varepsilon_{z_i}) \\ -\sin(\varepsilon_{y_i}) \end{pmatrix}$$

This is then coordinatized in the navigation reference frame, given the detector to body direction cosine matrix for sensor I ($C_{d_i}^b$) and the current best estimates of the vehicle orientation direction cosine matrix ($C_{b_i}^r$) using the following equation $$\hat{u}_i^r(C_b^r) = C_b^r \cdot C_{d_i}^b \cdot \hat{u}_i^{d_i} = \begin{pmatrix} u_{i_{r_x}}(C_b^r) \\ u_{i_{r_y}}(C_b^r) \\ u_{i_{r_z}}(C_b^r) \end{pmatrix}$$

Next, this same unit LOS unit vector (expressed in the navigation reference frame) is computed using the best estimate of ownship position and knowledge of the survey point geolocation. This is defined by the following equations:

$$r_i = \left( (\bar{x}_{S_i}^r - \hat{x}^r)^T (\bar{x}_{S_i}^r - \hat{x}^r) \right)^{1/2}$$

$$\hat{u}_i^r(\hat{x}^r) = \begin{pmatrix} u_{i_{r_x}}(\hat{x}^r) \\ u_{i_{r_y}}(\hat{x}^r) \\ u_{i_{r_z}}(\hat{x}^r) \end{pmatrix} = \frac{\bar{x}_{S_i}^r - \hat{x}^r}{r_i}$$

Where $\bar{x}_{S_i}^r$ is the geolocation of a surveyed site tracked by the $i^{th}$ sensor, and $\hat{x}^r$ is the current estimate of the ship's position.

At this point, the azimuth ($\beta_i(C_b^r)$ and $\beta_i(\hat{x}^r)$) and elevation ($\alpha_i(C_b^r)$ and $\alpha_i(\hat{x}^r)$) Euler angles (relative to the navigation reference frame) are computed for each of the above LOS unit vector mechanizations, respectively. These are determined by the following formulas:

$$\alpha_i(\hat{x}^r) = -\sin^{-1}(u_{i_{r_z}}(\hat{x}^r))$$

$$\beta_i(\hat{x}^r) = \tan^{-1}\left(\frac{u_{i_{r_y}}(\hat{x}^r)}{u_{i_{r_x}}(\hat{x}^r)}\right)$$

$$\hat{\varepsilon}_i(\hat{x}^r) = \begin{pmatrix} \alpha_i(\hat{x}^r) \\ \beta_i(\hat{x}^r) \end{pmatrix}$$

And $$\alpha_i(C_b^r) = -\sin^{-1}(u_{i_{r_z}}(C_b^r))$$

$$\beta_i(C_b^r) = \tan^{-1}\left(\frac{u_{i_{r_y}}(C_b^r)}{u_{i_{r_x}}(C_b^r)}\right)$$

$$\hat{\varepsilon}_i(C_b^r) = \begin{pmatrix} \alpha_i(C_b^r) \\ \beta_i(C_b^r) \end{pmatrix}$$

An embodiment of a Kalman filter that reckons corrections in the current vehicle position ($\hat{x}^r$) and attitude ($C_b^r$) estimates, based on the residual differences between the two sets of computed Euler angles ($\hat{\varepsilon}_i(\hat{x}^r)$ and $\hat{\varepsilon}_i(C_b^r)$), may be accomplished using the following set of equations. First, the linear relationship between the residuals and the uncertainties in the position and attitude estimates is defined by the measurement mapping matrix:

$$H(C_b^r, \hat{x}^r) = \begin{pmatrix} H_1(C_b^r, \hat{x}^r) \\ H_2(C_b^r, \hat{x}^r) \\ H_3(C_b^r, \hat{x}^r) \end{pmatrix}$$

where $$H_i(C_b^r, \hat{x}^r) = (F(\hat{u}_i^r(C_b^r)) \; G(\hat{u}_i^r(\hat{x}^r)))$$

$$F(\hat{u}_i^r(C_b^r)) = (f^T(\hat{u}_i^r(C_b^r)) \cdot f(\hat{u}_i^r(C_b^r)))^{-1} \cdot f^T(\hat{u}_i^r(C_b^r)) \cdot (x\hat{u}_i^r(C_b^r))$$

$$G(\hat{u}_i^r(\hat{x}^r)) = -(f^T(\hat{u}_i^r(\hat{x}^r)) \cdot f(\hat{u}_i^r(\hat{x}^r)))^{-1} \cdot f^T(\hat{u}_i^r(\hat{x}^r)) \cdot (I - \hat{u}_i^r(\hat{x}^r) \cdot (\hat{u}_i^r(\hat{x}^r))^T)/r_i$$

and $$f(\hat{u}_i^r(\hat{x}^r)) = \begin{pmatrix} -\sin(\alpha_i(\hat{u}_i^r(\hat{x}^r))) \cdot \cos(\beta_i(\hat{u}_i^r(\hat{x}^r))) & -\cos(\alpha_i(\hat{u}_i^r(\hat{x}^r))) \cdot \sin(\beta_i(\hat{u}_i^r(\hat{x}^r))) \\ -\sin(\alpha_i(\hat{u}_i^r(\hat{x}^r))) \cdot \sin(\beta_i(\hat{u}_i^r(\hat{x}^r))) & \cos(\alpha_i(\hat{u}_i^r(\hat{x}^r))) \cdot \cos(\beta_i(\hat{u}_i^r(\hat{x}^r))) \\ -\cos(\beta_i(\hat{u}_i^r(\hat{x}^r))) & 0 \end{pmatrix}$$

$$f(\hat{u}_i^r(C_b^r)) = \begin{pmatrix} -\sin(\alpha_i(\hat{u}_i^r(C_b^r))) \cdot \cos(\beta_i(\hat{u}_i^r(C_b^r))) & -\cos(\alpha_i(\hat{u}_i^r(C_b^r))) \cdot \sin(\beta_i(\hat{u}_i^r(C_b^r))) \\ -\sin(\alpha_i(\hat{u}_i^r(C_b^r))) \cdot \sin(\beta_i(\hat{u}_i^r(C_b^r))) & \cos(\alpha_i(\hat{u}_i^r(C_b^r))) \cdot \cos(\beta_i(\hat{u}_i^r(C_b^r))) \\ -\cos(\beta_i(\hat{u}_i^r(C_b^r))) & 0 \end{pmatrix}$$

Note that, in these equations, $$(x\hat{u}_i^r) = \begin{pmatrix} 0 & u_{i_{r_z}} & -u_{i_{r_y}} \\ -u_{i_{r_z}} & 0 & u_{i_{r_x}} \\ u_{i_{r_y}} & -u_{i_{r_x}} & 0 \end{pmatrix}$$

is the skew symmetric matrix equivalent to the vector ($\hat{u}_i^r$) in a cross product sense.

At this point the Kalman filter gains are computed using the equation:

$$K = P \cdot H^T(C_b^r, \hat{x}^r) \cdot [H(C_b^r, \hat{x}^r) \cdot P \cdot H^T(C_b^r, \hat{x}^r) + R]^{-1}$$

Where P is the (6×6) error covariance matrix that represents, statistically, how well the filter thinks it has estimated the states and how correlated it believes the various state errors are with each other. In addition, R is the (3×3) measurement noise covariance matrix that defines the fidelity of the three angle measurements and the interrelationship between them. The corrections to the states are then computed via the equation:

$$\begin{pmatrix} \delta x_{r_x} \\ \delta x_{r_y} \\ \delta x_{r_z} \\ \phi_x \\ \phi_y \\ \phi_z \end{pmatrix} = K \cdot \begin{pmatrix} \alpha_1(C_b^r) - \alpha_1(\hat{x}^r) \\ \beta_1(C_b^r) - \beta_1(\hat{x}^r) \\ \alpha_2(C_b^r) - \alpha_2(\hat{x}^r) \\ \beta_2(C_b^r) - \beta_2(\hat{x}^r) \\ \alpha_3(C_b^r) - \alpha_3(\hat{x}^r) \\ \beta_3(C_b^r) - \beta_3(\hat{x}^r) \end{pmatrix}$$

At this point the corrections are applied to the position estimate via the relationship:

$$\hat{x}^r = \hat{x}^r - \begin{pmatrix} \delta x_{r_x} \\ \delta x_{r_y} \\ \delta x_{r_z} \end{pmatrix}$$

And to the direction cosine matrix estimate through the equations:

$$\hat{\phi}^r = \begin{pmatrix} \phi_{r_x} \\ \phi_{r_y} \\ \phi_{r_z} \end{pmatrix}$$

$$\phi = (\phi_{r_x}^2 + \phi_{r_y}^2 + \phi_{r_z}^2)^{1/2}$$

$$\hat{u}_{\phi_r}^r = \begin{pmatrix} \phi_{r_x} \\ \phi_{r_y} \\ \phi_{r_z} \end{pmatrix} / \phi$$

$$C_r' = \cos(\phi) \cdot I + \hat{u}_{\phi_r}^r \cdot (\hat{u}_{\phi_r}^r)^T \cdot (1 - \cos(\phi)) - [\times \hat{u}_{\phi_r}^r] \cdot \sin(\phi)$$

$$C_b^r = C_r' \cdot C_b^r$$

Finally, the filter estimation error covariance matrix is updated, reflecting the fidelity of the measurements and their applicability in enhancing the quality of the position and attitude estimates, $$S=(I-K\cdot H(C_b^r,\hat{x}^r))\cdot P\cdot (I-K\cdot H(C_b^r,\hat{x}^r))^T+K\cdot R\cdot K^T$$

And then propagated forward in time, accounting for the random growth in uncertainty pertinent to the dynamics model, $$P=S+Q\cdot \Delta t$$

In instances where the sensors are RADAR or Infra-red, or otherwise seeking active signal emitters, the LOS calculations are done with respect to the signal emitters, eliminating the need for image chips and image correlation.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A method of electro-optical absolute attitude determination of an object comprising:
   capturing a frame of image data of a first scene with a detector or sensor that measures angles of detected features within the captured frame of image data with respect to the detector's boresight reference relative to the object;
   identifying at least three features from the captured frame of image data of said first scene by
   selecting features within the pixel space of the captured frame of image data; and
   computationally correlating said identified features to features in a map to determine corresponding map locations of said identified features and a location of the object within the map; calculating, with a processor, the absolute attitude based on the difference between the locations of the at least three features in the captured frame of image data and the locations of the correlated features in the map by
   transforming the correlated features from the map into a first set of object space angular coordinates based on the location of the object within the map and the measured angles of the correlated features to generate horizontal, vertical, and arc coordinate values.

2. The method of claim 1, said captured frame of image data including object-relative locations of passively-detected transmitter beacons wherein at least one feature of said at least three features comprises a transmitter beacon location.

3. The method of claim 1, said captured frame of image data comprising visible-spectrum imaging data.

4. The method of claim 1, said map comprising a terrain map.

5. The method of claim 1, wherein measuring angles of detected features with respect to the detector's boresight reference relative to the object includes calculating a line-of-sight (LOS) unit vector from the detector or sensor to an identified feature; and
   where the LOS unit vector is computed as a function of LOS angles (and) measured relative to the detector or sensor, such that the unit vector (u) is given by the expression:

$$\hat{u}_i^{d_i} = \begin{pmatrix} \cos(\varepsilon_{y_i})\cdot \cos(\varepsilon_{z_i}) \\ \cos(\varepsilon_{y_i})\cdot \sin(\varepsilon_{z_i}) \\ -\sin(\varepsilon_{y_i}) \end{pmatrix}.$$

6. The method of claim 1, the method further comprising:
   capturing a second frame of image data of the first scene with a second detector that measures angles of detected features within the second frame of image data with respect to the second detector's boresight reference relative to the object; and
   identifying said selected features in the captured second frame of image data of said first scene;
   where transforming the selected features into a set of object space angular coordinates further includes transforming the selected features into said set of object space angular coordinates based on the measured angles from the second detector, and a known line-of-sight (LOS) boresight angle between the first and second detectors.

7. The method of claim 6, where the first and second detectors have different detection wavelength ranges.

8. A device for electro-optically determining absolute attitude of an object, the device comprising:
   an imaging sensor that captures a frame of image data of a first scene and that measures the angles of detected features within the captured frame of image data with respect to the sensor's boresight reference relative to the object;
   a feature identification unit that identifies at least three features in captured frame of image data, the feature identification unit comprising
   a feature selection unit that selects features within the pixel space of the captured frame of image data; and
   a feature correlation unit that correlates said identified features to a map;
   a feature location unit that determines corresponding map locations of the correlated features and a location of the object within the map; and
   an attitude calculator that calculates the absolute attitude based on the difference in the locations of at least three features in the frame of image data and the locations of the correlated features in the map, the attitude calculator comprising
   a space transformation module that transforms the correlated features from the map into a first set of object space angular coordinates based on the location of the object within the map and the measured angles of the correlated features to generate horizontal, vertical, and arc coordinate values.

9. The device of claim 8, said captured frame of image data comprising object-relative locations of passively-detected transmitter beacons wherein at least one feature of said at least three features comprises a transmitter beacon location.

10. The device of claim 8, said imaging sensor comprising a visible-spectrum imaging sensor.

11. The device of claim 8, further comprising a memory unit that stores said map, wherein the map includes a terrain map.

12. The device of claim 8, the device further comprising:
    a second imaging sensor that captures a second frame of image data of the first scene and measures the angles of detected features within the second frame of image data with respect to the second detector's boresight reference relative to the object;
    where the feature identification unit identifies the selected features in the second frame of image data; and where the space transformation module transforms the selected features into a set of object space angular coordinates by also transforming the selected features into said set of object space angular coordinates based on the measured angles from the second detector, and a known line-of-sight (LOS) boresight angle between the first and second detectors.

13. The device of claim 12, where the first and second detectors have different detection wavelengths.

14. A non-transitory computer-readable medium having embodied thereon instructions which, when executed by a computing device, cause the device to perform a method of electro-optical absolute attitude determination of an object comprising:
  capturing a frame of image data of a first scene with a detector or sensor that measures angles of detected features within the captured frame of image data with respect to the detector's boresight reference relative to the object;
  identifying at least three features from the captured frame of image data of said first scene by
selecting features within the pixel space of the captured frame of image data; and
  computationally correlating said identified features to features in a map to determine corresponding map locations of said identified features and a location of the object within the map; calculating, with a processor, the absolute attitude based on the difference between the locations of the at least three features in the captured frame of image data and the locations of the correlated features in the map by
transforming the correlated features from the map into a first set of object space angular coordinates based on the location of the object within the map and the measured angles of the correlated features to generate horizontal, vertical, and arc coordinate values.

15. The medium of claim 14, said captured frame of image data including object-relative locations of passively-detected transmitter beacons wherein at least one feature of said at least three features comprises a transmitter beacon location.

16. The medium of claim 14, said captured frame of image data comprising visible-spectrum imaging data.

17. The medium of claim 14, said map comprising a terrain map.

18. The medium of claim 14, wherein measuring angles of detected features with respect to the detector's boresight reference relative to the object includes calculating a line-of-sight (LOS) unit vector from the detector or sensor to an identified feature; and
  where the LOS unit vector is computed as a function of LOS angles (and) measured relative to the detector or sensor, such that the unit vector (u) is given by the expression:

$$\hat{u}_i^{d_i} = \begin{pmatrix} \cos(\varepsilon_{y_i}) \cdot \cos(\varepsilon_{z_i}) \\ \cos(\varepsilon_{y_i}) \cdot \sin(\varepsilon_{z_i}) \\ -\sin(\varepsilon_{y_i}) \end{pmatrix}.$$

19. The medium of claim 14, the method further comprising:
  capturing a second frame of image data of the first scene with a second detector that measures angles of detected features within the second frame of image data with respect to the second detector's boresight reference relative to the object; and
  identifying said selected features in the captured second frame of image data of said first scene;
  where transforming the selected features into a set of object space angular coordinates further includes transforming the selected features into said set of object space angular coordinates based on the measured angles from the second detector, and a known line-of-sight (LOS) boresight angle between the first and second detectors.

20. The medium of claim 19, where the first and second detectors have different detection wavelength ranges.

* * * * *